United States Patent [19]

Brikez

[11] Patent Number: 5,972,056
[45] Date of Patent: Oct. 26, 1999

[54] METHOD OF MANUFACTURING A BATTERY ELECTRODE

[75] Inventor: Alexandr Mikhailovich Brikez, Kursk, Russian Federation

[73] Assignees: Aktsionernoe Obschestvo Zakrytogo Tipa "Elit", Kursk; Aktsionernoe Obschestvo Zakrytogo Tipa "Esma", Moscow, Russian Federation

[21] Appl. No.: 08/849,094

[22] PCT Filed: Oct. 10, 1995

[86] PCT No.: PCT/RU95/00222

§ 371 Date: Apr. 9, 1998

§ 102(e) Date: Apr. 9, 1998

[87] PCT Pub. No.: WO96/17393

PCT Pub. Date: Jun. 6, 1996

[30] Foreign Application Priority Data

Nov. 29, 1994 [RU] Russian Federation .............. 94042552

[51] Int. Cl.[6] ...................................... H01M 4/04
[52] U.S. Cl. ........................................... 29/623.5; 429/217
[58] Field of Search ..................... 429/217, 212, 429/213; 29/623.5

[56] References Cited

U.S. PATENT DOCUMENTS

| | | |
|---|---|---|
| 3,954,506 | 5/1976 | Sullivan . |
| 4,297,420 | 10/1981 | Chenaux et al. ........................ 429/217 |
| 5,262,255 | 11/1993 | Ito et al. ................................. 429/217 |
| 5,595,841 | 1/1997 | Suzuki ..................................... 429/217 |
| 5,639,100 | 6/1997 | Yoshino et al. ............................ 429/62 |

FOREIGN PATENT DOCUMENTS

| | | |
|---|---|---|
| 0 603 391 | 6/1994 | European Pat. Off. . |
| 2 415 882 | 8/1979 | France . |
| 46-17545 | 9/1967 | Japan . |
| 8-157677 | 6/1996 | Japan . |
| 9-199130 | 7/1997 | Japan . |
| 9-199132 | 7/1997 | Japan . |

OTHER PUBLICATIONS

Masanori, "Flat Plate Type Battery", Patent Abstracts of Japan, vol. 11, No. 88 (E–490), Mar. 18, 1987.

Masayuki, "Manufacture Of Cadmium Negative Plate For Alkaline Storage Batter", Patent Abstracts of Japan, vol. 10, No. 268, Sep. 12, 1986.

*Primary Examiner*—Maria Nuzzolillo
*Assistant Examiner*—Carol Chaney
*Attorney, Agent, or Firm*—Pennie & Edmonds LLP

[57] ABSTRACT

A method for producing a battery electrode which includes the steps of:

1) mixing active material, methyl methacrylate/butadiene copolymer binder, and water;

2) drying the mixture so that it contains between 1% to 3.5% by weight of residual moisture; and 3) applying the dried material to a current collector. The novelty of this invention resides in drying the active material mixture prior to applying the mixture to the current collector.

4 Claims, No Drawings

METHOD OF MANUFACTURING A BATTERY ELECTRODE

TECHNICAL FIELD

The present invention relates to electrical engineering industry, in particular to the manufacture of nickel-cadmium, nickel-hydride, and other alkaline accumulators and can be used in the production of primary current generator cells.

BACKGROUND ART

There has been known a process for manufacturing a battery electrode, comprising the steps of mixing active material with a binder, applying the mixture so obtained to a current collector and drying (see Japanese patent application No. 17545/71, C1. 57C2, 1971).

One of the major drawbacks of said process is its limitation in utilizing more efficient methods of applying the active material to the current collector, with the exception of a method for smearing. This is caused by the fact that, when using these methods of applying active materials to a collector, namely milling and pressing, which allow preparation of electrodes with higher capacities per unit weight, a wet mixture of active materials will be squeezed out. In addition to the above problem, when drying an active material of a smeared electrode, warping is unavoidable so that an additional process for milling becomes necessary to straighten said electrode. Drying requires a complete hardening of a binder. As a result, the destruction of the electrode skeleton structure takes place when the binder polymerizes during rolling and drying. The destruction results in the decrease of electrode strength and flexibility. The destruction also disturbs the contact between separate particles of active materials, leading to the decrease of capacity of such electrodes.

The closest prior art dealing with processes for making electrodes of the same purpose has been described in a method for manufacturing a battery electrode, comprising the steps of mixing an active material with a binder, applying a mixture so obtained to the lead, and drying (see French Patent No.2415882, Int. C1. HO1M 4/32, 1979).

It is, however, impossible to use the above method during one main stage (rolling and pressing), to obtain an electrode with predetermined weight characteristics due to an intense creep of the paste. When applying the paste onto a current collector using the said method, additional means (porous bands, cords, etc.) for dehydrating and keeping clear of the paste to operating parts are required, resulting in considerable complication of the manufacturing process.

Moreover, electrodes made by the said method using a tentative binder possess a limited flexibility which narrows the spectrum of applicability of, for example, small-scale cylindrical primary current generator cells due to the cracking of electrodes while coiling.

SUMMARY OF THE PRESENT INVENTION

The present invention is made in order to solve the above problems in the prior arts, and an object of this invention is to provide a new method of manufacturing a battery electrode which, as compared to previously known methods for the same purpose, allows simplification of the manufacturing process and improvement in mechanical strength of the electrode.

An achievement of the present invention is the simplification of battery electrode manufacturing process by reducing the number of equipments required to implement the process. Another achievement is the separation of the drying stage from the direct manufacturing of a finished electrode. One result of these achievements is that drying itself does not predetermine a direct manufacture time and the active materials with a given end moisture content that does not affect electrochemical and gravimetric characteristics of the electrode allow flexible use of the aforementioned time. Another result of the present is the improvement in mechanical strength of the electrodes due to the decrease in its brittleness and tendency to crack while coiling for small-scale cylindrical primary current generator cells.

The present invention provides a method of manufacturing a battery electrode, comprising the steps of mixing an active material with a binder, drying the mixture so that it contains a residual moisture of 1.0%–3.5% by mass, and applying the mixture so obtained to a lead. An aqueous dispersion of methyl methacrylate-butadiene copolymer is used as said binder in the following ratio of constituents in parts by mass:

active material . . . 100
aqueous dispersion of methyl
methacrylate-butadiene copolymer . . . 2.4–24
water . . . 10–40

The present invention provides for the broadening of technological capabilities as to the use of different methods for applying active materials to the lead and allows an improved flexibility of the electrode (without destruction of the substrate) by using a new binder with a corresponding ratio of constituents and drying a mixture to a certain residual moisture.

BEST MODE FOR CARRYING OUT THE INVENTION

The present process is carried out as follows:

To prepare an electrode, 100 parts by mass of active material is mixed with 2.4–24 parts by mass of a binder. As the binder, an aqueous dispersion of methyl methacrylate-butadiene copolymer (a synthetic latex) predissolved in water is used, wherein said latex amounts to 2%–10% by weight on dry substance basis.

The latex's aggregative stability decreases and its viscosity increases with its increasing concentration. While mixing the active material with the binder, 10–40 parts by mass of water is added. Thereupon, drying of the mixture so obtained is carried out up to a residual moisture of 1.0%–3.5% by mass and said mixture is then applied to the lead.

The strength and flexibility of electrodes obtained are due to the optimal relationship achieved among the physical parameters and properties of the binder, since the physical action (milling, pressing) with respect to the active materials is performed at the stage of gelling the binder (with the residual moisture) onto the lead. At this stage, the latex has highest adhesive properties and its molecular bond are strong. Porosity of the finished electrodes is explained by polydispersity of latex (the presence of particles ranging 0.1 nm to 50 nm), which leads to the formation of a heterogeneous structure (a film on the active mass constituents) with a loose packing of latex particles in which discrete large particles are separated by spaces commensurable with their dimensions or exceeding thereof. A porous space-skeleton hydrophilic lattice so formed does not induce diffusion difficulties.

EXAMPLES

Example 1

A conducting acetylene carbon black in the amount of 2.5% by mass is added to a powder of hydrogen absorbing alloy (HAA) for use as a negative electrode of a nickel-metal hydride battery (it is also possible to avoid the use of said black, since available metals and their hydrics possess electric conductivity that is greater than that of said carbon black). A solution of 41% aqueous dispersion of methyl methacrylate-butadiene copolymer is prepared separately (a synthetic latex). The latex is then diluted with distilled water in a volume ratio of 1:1. 12.2 g of this 41% latex is mixed with 100 g of the alloy which results in 5% content of a dry copolymer residue in the active material. The mixture then is diluted with 12 ml of water. While stirring (n=500–600 rpm), the diluted latex is introduced into the dry mixture followed by the addition of ½ volume of water (based on the amount introduced earlier, i.e., 12/2=6 g per 100 g alloy) and the mixture obtained is stirred for 20 minutes. Under these conditions and with the above-mentioned percentage, the finished active materials, after stirring, has a "luxuriant" consistency. Thereupon, said finished material is dried on a desiccator tray at 80° C. to a 2.5% residual moisture level. The said finished active materials is milled to a nickel stretching strip with a 0.1 mm thickness. The belt formed is flexible and strong and it withstands bending of radius 5 mm without cracks and fractures. The belt thickness varies from 0.6 mm to 0.9 mm. The belt then is cut into electrodes of required sizes and a lead is welded to the belt and used for assembly of batteries.

Example 2

Under the conditions of Example 1, except that 2.2 g, instead of 12.2 g, of the 41% aqueous dispersion of methyl methacrylate-butadiene copolymer are used with 100 g of the alloy and the drying is carried out to a 0.9% residual moisture level in the active materials. The belt formed is strong but thicker (with the same roll nips): 0.75 to 1.0, and stiff; it cracks when coiling.

Example 3

Under the conditions of Example 1, except that 2.4 g, instead of 12.2 g, of the 41% aqueous dispersion of methyl methacrylate-butadiene copolymer are used with 100 g of the alloy and the drying is carried out to a 1.0% residual moisture level in the active materials. The belt formed is even, smooth, with a good flexibility.

Example 4

Under the conditions of Example 1, except that 24.0 g, instead of 12.2 g, of the 41% aqueous dispersion of methyl methacrylate-butadiene copolymer are used with 100 g of the alloy and the drying is carried out to a 4.0% residual moisture level in the active materials. The belt formed is of satisfactory thickness, strength, and flexibility.

Example 5

Under the conditions of Example 1, except that 24.1 g, instead of 12.2 g, of the 41% aqueous dispersion of methyl methacrylate-butadiene copolymer are used with 100 g of the alloy and the drying is carried out to a 4.1% residual moisture level in the active materials. The active material (with the same roll nips) mills poorly, the belt travels with passes, and the active material adheres to rolls. The belt formed is of a satisfactory strength in the presence of rather large roll nips. The substrate is thick and brittle.

Active materials were also produced for positive and negative electrodes of nickel-cadmium batteries.

For positive electrodes, active material consisting of nickel hydroxide, graphite (or without thereof), carbonyl nickel (used in batch production), and the present latex within a range of 2–10 weight percent based on dry substance (2.4 to 24.0 wt. parts) was employed.

When producing a positive active material lacking graphite, a carbonyl nickel powder within a range of 20 to 60 wt. parts per 100 parts of nickel hydroxide was used as a conducting constituent.

The same amount of latex was introduced into a negative material consisting of cadmium oxide and different stabilizers (used in batch production).

In all the above-mentioned examples, highly reproducible technological characteristics were achieved which are presented in Table 1

TABLE 1

Parameters
Binder content
in active materials

| Aqueous dispersion in mixing, parts by mass | Copolymer after drying, % | Results achieved | Remarks |
|---|---|---|---|
| 2.2 | 0.9 | The belt is more thick, stiff, and easy to break down when coiling | |
| 2.4 | 1.0 | The belt is even, smooth with a good flexibility | |
| 3.7 | 1.5 | the same | |
| 4.8 | 2.0 | the same | |
| 7.3 | 3.0 | the same | |
| 12.2 | 5.0 | Good thickness (0.6 to 0.9 mm) and flexibility | |
| 17.0 | 7.0 | Thickness is less than 0.6 mm good flexibility | Without black, it is possible to prepare 0.5 mm electrode |
| 24.0 | 9.8 | Satisfactory thickness and good flexibility | |
| 24.1 | 10.0 | Capacity per unit weight is lowered significantly, active mass is poorly milled, adheres to rolls. The substrate is thick and brittle. | |
| Residual moisture in active mass, % | | | |
| 0.9 | | The belt is brittle | |
| 1.0 | | Good belt flexibility | |
| 2.0 | | Good flexibility the belt is more thin | |
| 3.0–3.5 | | Good flexibility, a minimal belt thickness | |
| 4.0 | | Satisfactory thickness, good flexibility | |
| 4.1 | | Active mass adheres to rolls. The belt is thick and brittle | |

The method in accordance with the present invention allows manufacture of electrodes for current generator cells of both polarities with highly reproducible voltage-current and technological characteristics; it can also be used to manufacture substrates for cermet electrodes and electrodes for primary current generator cells.

What is claimed is:

1. A method of manufacturing a battery electrode comprising the steps of:

mixing 100 parts by mass of an active material, 2.4 to 24 parts by mass of an aqueous dispersion of methyl methacrylate/butadiene copolymer, and 10 to 40 parts by mass of water to form a mixture;

drying the mixture so that it contains a residual moisture of 1% to 3.5% by mass; and applying the dried mixture to a current collector to form the battery electrode.

2. The method according to claim 1, wherein the aqueous dispersion of methyl methacrylate/butadiene copolymer contains 2%–10% of methyl methacrylate/butadiene copolymer by mass.

3. The method according to claim 1, wherein the mixture contains a residual moisture amount of 2.5% after drying.

4. The method according to claim 1, wherein the mixture is dried on a desiccator tray at 80° C.

* * * * *

UNITED STATES PATENT AND TRADEMARK OFFICE
CERTIFICATE OF CORRECTION

PATENT NO. : 5,972,056

DATED : October 26, 1999

INVENTOR(S) : Alexandr Mikhailovich BRIKEZ

It is certified that error appears in the above-identified patent and that said Letters Patent is hereby corrected as shown below:

TITLE PAGE, [22] PCT Filed:

change "Oct. 10, 1995" to --Oct. 19, 1995--.

Signed and Sealed this

Fifth Day of December, 2000

Attest:

Q. TODD DICKINSON

*Attesting Officer*     *Director of Patents and Trademarks*